April 11, 1967 R. F. CARIS 3,314,034
SEMICONDUCTOR STRAIN GAGE SYSTEM
Filed June 25, 1965 2 Sheets-Sheet 1

Inventor.
RICHARD F. CARIS
By
WILSON, SETTLE, BATCHELDER
ATT'YS. & CRAIG

April 11, 1967 R. F. CARIS 3,314,034
SEMICONDUCTOR STRAIN GAGE SYSTEM
Filed June 25, 1965 2 Sheets-Sheet 2

Inventor.
RICHARD F. CARIS
By
WILSON, SETTLE, BATCHELDER
ATT'YS. & CRAIG

United States Patent Office 3,314,034
Patented Apr. 11, 1967

3,314,034
SEMICONDUCTOR STRAIN GAGE SYSTEM
Richard F. Caris, Southfield, Mich., assignor to Lebow Associates, Inc., Oak Park, Mich., a corporation of Michigan
Filed June 25, 1965, Ser. No. 466,905
1 Claim. (Cl. 338—2)

This invention relates to semiconductor strain gage systems and more particularly to ways and means for making such systems insensitive to extraneous forces or effects, specifically such as temperature or thermal gradients which may be present in the test member.

This invention is useful in a wide variety of measuring or testing setups on load-receiving members such as torque shafts, tension members, compression columns, pressure indicators, accelerometers and the like.

Overcoming the effects of thermal gradients present in the test member, which gradients almost always exist, has been a major problem faced by systems using semiconductor strain gage elements because of the high thermal coefficient of resistance possessed by semiconductor materials.

It is a primary object of this invention to provide a semiconductor strain gage system, for achieving improved accuracy and stability in measurement of strain.

Another important object of this invention is the provision of a semiconductor strain gage system, which is essentially insensitive to temperature or thermal gradients and extraneous forces present in the test member.

A further important object is the provision of a novel strain gage system having a compact physical arrangement of parts.

In the achievement of the foregoing and other objects, a strain gage system of the present invention employs at least one pair of semiconductor strain gage elements, such as those made primarily of silicon and germanium, which are oriented in a centered criss-cross relation to balance out changes of the gage characteristics which may be induced by effects other than that being measured by the system. To achieve the proper orientation, one element is placed within and bonded to an elongated slot or recess fashioned in the surface of a test specimen or load member in electrically insulated relation. The longitudinal axes of the slot and the first semiconductor element will usually extend generally parallel to one principal stress axis. A second semiconductor strain gage element is angularly superimposed upon the first strain gage element, usually, but not necessarily crossing the first element at 90°, so that the thermal center or center of gravity of the second element lies directly over the thermal center or center of gravity of the first element. The second element is electrically insulated from the first element at the region of superposition. The bottom of the second semiconductor strain gage element is bonded to and electrically insulated from the surface of the test member at each side of the slot. The two semiconductor elements are connected to an external circuit, such as a Wheatstone bridge to generate a signal which includes opposite sign resistance changes due to effect being measured and resistance changes due to external effects such as thermal gradients of equal magnitude and the same sign. Thus, the output signal to the external circuitry reflects only the measured effect induced resistance changes.

These and other objects and features of this invention will become more fully apparent from the following description and the drawings in which.

Figure 1:
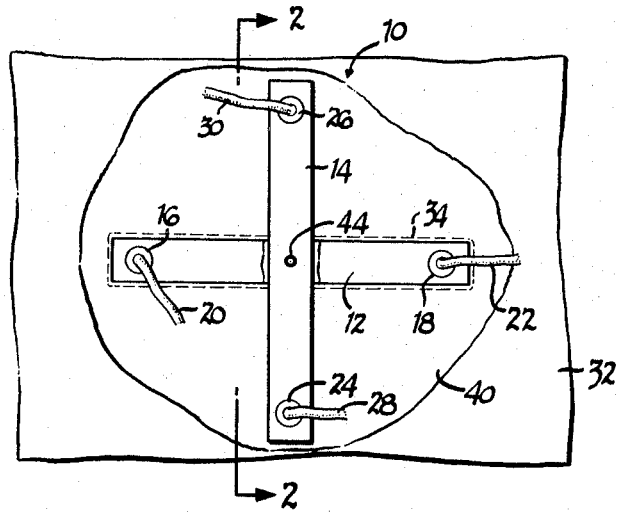
FIGURE 1 is a greatly enlarged plan view of one embodiment of this invention.

FIGURE 1 depicts, in schematic plan view, a presently preferred strain gage assembly, generally designated 10. The assembly 10 comprises a pair of angularly disposed semiconductor strain gage elements 12 and 14 respectively. The rectangularly shaped semiconductor elements 12 and 14, are normally very minute in size, one commercially available type having external length, width and depth dimensions of 0.250" x 0.006" x 0.001".

The semiconductor strain gage element 12 has two ohmic contacts at 16 and 18 to which electrical leads 20 and 22 are respectively connected. The element 14 has similar ohmic contacts at 24 and 26 to which electrical leads 28 and 30 are respectively attached. Such ohmic contacts may be provided by known techniques, such as metal plating followed by soldering or alloying.

Proper placement and orientation of the two semiconductor elements 12 and 14 with respect to each other and respect to a test member 32 is of extreme importance in this invention. The test member 32 may be the member to which an external load to be measured is applied or may be a carrier member adapted to be attached to a load member.

The installation of strain gage mechanism 10 upon the member 32 is described below. First, a slot or recess 34 is formed in the test member 32. This may be done by pressing, stamping, machining, etching or the like, stamping being presently preferred. The slot or recess 34 should be slightly longer, wider, and deeper than the gage element 12. Accordingly, a slot fashioned to receive a strain gage element having the previously described dimensions might be 0.300" long, 0.010" wide and 0.002" deep. The slot or recess 34 is preferably rounded at the edges and corners, identified by the numerals 36 and 38, in order to minimize stress concentration at those locations.

Next, the slot 34 and the surface area of the member 32 located adjacent the slot are covered with electrically insulating means, preferably being precoated with a thin coating of a suitable boding agent such as a bonding adhesive capable of rigidly securing the elements 12 and 14 in appropriate position and of electrically insulating the same from the member 32. One suitable bonding adhesive is BR-600 Epoxy available from W. T. Bean, Inc.

It is to be understood, however, that by bonding agent it is meant use of any suitable means or combination of means for insulating and securing the semiconductor elements 12 and 14 to the test member 32. This includes not only adhesive bonding, but also an anodic coating and a PN junction, used in conjunction with the desired bonding medium. Similarly, a thin piece of tissue glass, appropriately bonded, may be used to electrically insulate each gage element 12 and 14 from the test member 32. One suitable type of tissue glass is made by Pallflex Corporation.

Figure 2:
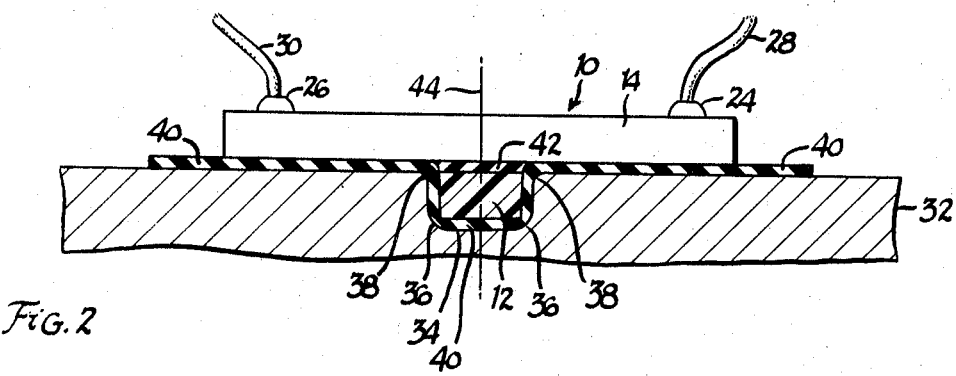
FIGURE 2 is a cross-sectional view taken along line 2—2 of FIGURE 1.

After the slot 34 and adjacent area has been coated with bonding agent, the semiconductor strain gage element 12 is, symmetrically placed within and bonded to the surface of the slot 34, as best illustrated in FIGURE 2. For best results, the general configuration of the test member 32, the element 12 and the slot 34 should generally correspond one with the other.

The following placement of the element 12 within the slot or recess 34, an insulating layer 42 is positioned at the upper central surface of the element 12. The electrical insulating layer 42 may be of any suitable type, for example, the previously described bonding agents are suitable.

Subsequently, the second semiconductor element 14 is angularly superimposed over the first element 12, the bottom of central portion thereof resting upon the layer 42 and the bottom of the ends thereof contacting the bonding agent 40. Once the bonding material 40 is cured the elements 12 and 14 are secured in position and are electrically insulated from the test member 32.

An important feature of the present invention resides in the relative overlapping positions of the two elements 12 and 14. To thermally center the two elements 12 and 14, the center of gravity of the element 14 is situated in direct alignment with the center of gravity of the element 12. The center of gravity of each element represents essentially the thermal center of that element in all cases where the thermal gradient is constant or where the thermal rate of change is constant, as is almost always the case. Thus, a line extended between the two centers of gravity or thermal centers form a common neutral axis to such thermal gradients. By placing one or both semiconductor elements 12 and 14 individually parallel to a principal stress axis in the test member 32, the line between the two centers of gravity will also be a neutral to extraneous forces present in the test member 32. The neutral axis is identified as 44 in FIGURES 1 and 2.

By this arrangement of strain gage components, the change in resistance brought about in each element 12 and 14 due to thermal gradients and extraneous forces will be of equal magnitude and of the same sign, which, when appropriately connected to external electrical circuitry as subsequently to be described, effectively cancels out each thermally induced change in resistance. Thus, only resistance changes incurred by strain are reflected in the circuitry output signal.

Because of this centered relationship, it is not essential that the angle between the two gage elements be 90°, nor is the orientation of the gage system relative to the thermal gradient critical.

As can be seen by reference to FIGURE 2, the depth of the slot 34 is best selected to be equal to the thickness of the semiconductor element 12 plus the thickness of the insulating layer 40. In this manner, the element 14 will lie directly adjacent the upper surface of the test member 32, separated therefrom only by the insulation layer 40.

Figure 3:
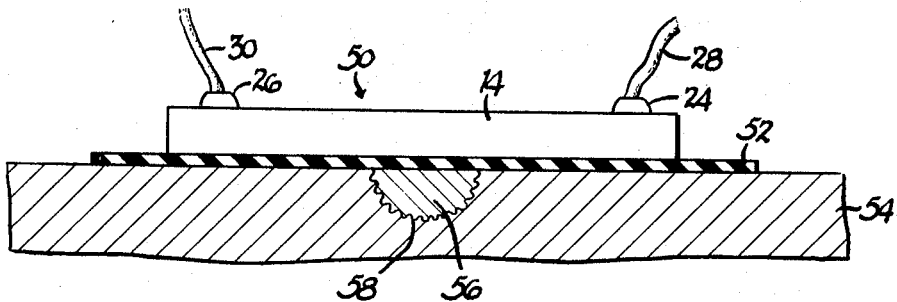
FIGURE 3 is an enlarged schematic representation of a strain gage system similar to that of FIGURES 1 and 2, employing a PN junction.

The strain gage assembly 50 of FIGURE 3 is similar in certain structural respects to the strain gage assembly 10 of FIGURES 1 and 2. The element 14, in its entirety, is used, FIGURE 3 being provided with proper numerical identification. An insulating layer 52, comparable to the previously described layer 42 is placed on the surface of a base member 54 of semiconductor material. A second element 56 constitutes an integral part of the member 54. Where elements 14 and 56 have "P" type conductivity, the member 54 will have to have "N" type conductivity. Where the member 54 does initially have "N" type conductivity, the "P" zone 56 may be formed by placing member 54 in diffusion furnace which contains a "P" type dopant, such as boron, and by vapor diffusing the "P" type dopant into the member 54 by application of heat. Thus, the "PN" junction 58 is formed, which functions to electrically insulate the zone 56 from the remainder of member 54.

Figure 4:
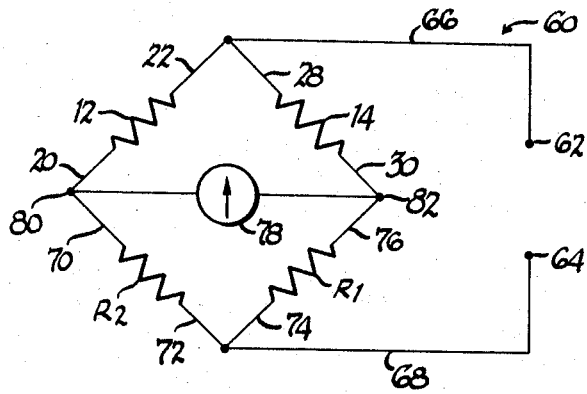
FIGURE 4 is a schematic circuit diagram of a Wheatstone bridge circuit employing the semiconductor strain gage arrangement of either FIGURES 1 and 2, or FIGURES 3.

The external circuitry schematically depicted in FIGURE 4 and generally designated 60 is the preferred mode of electrically connecting one strain gage assembly 10 (or one strain gage assembly 50). During use, an applied or input voltage is impressed upon the circuit 60 at the terminals 62 and 64, the terminals being respectively connected to the lead wires 66 and 68. The semiconductor elements 12 and 14, functioning as resistance elements, are electrically connected by their respective leads 20, 22 and 28, 30 to the circuitry as depicted in FIGURE 4. The bridge circuit 60 is completed by utilization of lead wires 70, 72 and 74, 76 respectively, for resistances R2 and R1, each of known resistivity. An output signal meter 78 of suitable type is connected between the bridge points 80 and 82.

By use of the bridge circuit 60, the effect of resistance changes caused by thermal gradients and extraneous forces in each of the two semiconductor elements 12 and 14 is cancelled, being of equal magnitude and of the same sign and impressed upon opposite sides of the output signal meter 78. Thus, the only source of unbalance on the meter 78 is a change in resistance which takes place in the semiconductor elements 12 and 14 due to load-induced strain present in the test member 32. Thus, the output signal at the meter 78 will at all times be directly proportional to the external load applied to the test member 32, whether that load be tension, compression, torsion, bending, etc.

The present invention is adaptable for many load-sensing applications. Three broadly representative applications are illustrated in FIGURES 5, 6 and 7, and 8.

Figure 5:
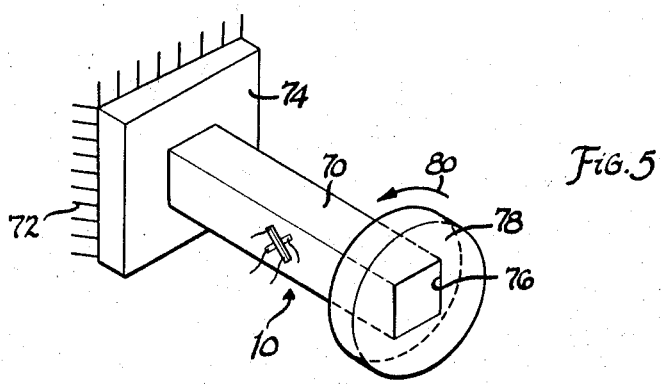
FIGURES 5 and 6 are schematic representations of exemplary ways in which the present strain gage invention may be utilized as a motion or load sensing instrument.

FIGURE 5 schematically illustrates, in perspective, the presently preferred novel strain gage assembly 10 installed on the surface of a square torque bar 70, to measure torsion load imposed thereon. The longitudinal axes of the perpendicular elements 12 and 14 are disposed in parallel relation to the principal torsional stress axes present in the torque bar 70 during loading. The torque bar 70 is rigidly anchored at 72 by means of a base 74 and is also non-rotatably secured at 76 to a wheel 78 in any suitable manner. Any desired prime mover (not shown) may be utilized to rotate the wheel 78 and thus twist the square rod 70, as indicated by the arrow 80. Twisting of the member 70 induces a torsional strain, which is measured by the strain gage assembly 10 in the previously described manner.

Figure 6:
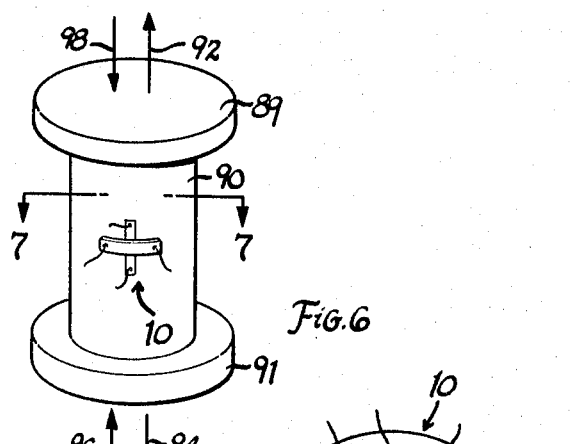
Figure 7:
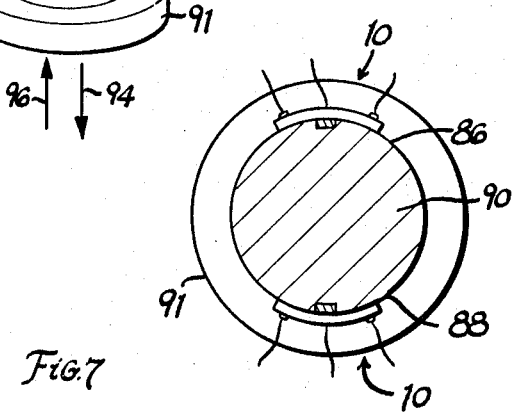
FIGURE 7 is a cross-sectional view taken along line 7—7 of FIGURE 6 showing the use of two pairs of semiconductor strain gage elements.

A pair of strain gage assemblies 10 can also be mounted upon opposed surfaces 86 and 88 of a test member 90, as diagrammatically shown in FIGURES 6 and 7. The member 90 may act as a tension member having force exerted thereon as depicted by arrows 92 and 94 or the member 90 may act as a column having force exerted thereon through the ends 89 and 91 as indicated by arrows 96 and 98. The two strain gage assemblies 10 are installed with one semiconductor element of each assembly extending parallel to the line of the compressive or tensile forces, and function in the previously described manner.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a strain gage system, a test member, a pair of semiconductor strain gages, means defining a slot in said test member adapted to receive one of said gages, a layer of insulating material disposed upon the surfaces of said slot and extending outwardly upon the surface of said test member from opposite sides of said slot, one of said gages being located within said slot and bonded therein by said insulating material with the lower surface of said one of said gages being spaced from the bottom of said slot by the thickness of said layer of insulating material, the other of said gages extending laterally across said slot with the thermal center of said other gage being located directly above the thermal center of said one gage, said other gage being bonded to the surface of said test member by said layer of insulating material and having its lower surface spaced from the surface of said test member by the thickness of said layer of insulating material.

References Cited by the Examiner

UNITED STATES PATENTS

| | | | |
|---|---|---|---|
| 2,429,087 | 10/1947 | Aughtie et al. | 338—2 |
| 2,939,317 | 6/1960 | Mason | 338—2 |
| 3,004,176 | 10/1961 | Mason et al. | 317—235 |
| 3,009,056 | 11/1961 | Bone et al. | 338—3 |
| 3,084,300 | 4/1963 | Sanchez | 338—2 |
| 3,123,788 | 3/1964 | Pfann et al. | 338—2 |
| 3,205,464 | 9/1965 | Schwartz | 338—6 |

FOREIGN PATENTS 689,756   6/1964   Canada.

ANTHONY BARTIS, *Primary Examiner.*

RICHARD M. WOOD, *Examiner.*

W. D. BROOKS, *Assistant Examiner.*